United States Patent
Gobeil

(10) Patent No.: US 8,572,509 B2
(45) Date of Patent: Oct. 29, 2013

(54) DYNAMICALLY GENERATING CONTEXT DEPENDENT HYBRID CONTEXT MENUS BY TRANSFORMING A CONTEXT SPECIFIC HIERARCHICAL MODEL

(75) Inventor: Charles M. Gobeil, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 12/907,320

(22) Filed: Oct. 19, 2010

(65) Prior Publication Data

US 2011/0093815 A1 Apr. 21, 2011

(51) Int. Cl.
*G06F 3/048* (2013.01)
(52) U.S. Cl.
USPC .......................... 715/834; 715/825
(58) Field of Classification Search
USPC .................................. 715/825, 834
See application file for complete search history.

(56) References Cited

U.S. PATENT DOCUMENTS

| | | | | |
|---|---|---|---|---|
| 4,821,211 A * | 4/1989 | Torres | | 715/853 |
| 5,625,783 A * | 4/1997 | Ezekiel et al. | | 715/825 |
| 5,627,960 A * | 5/1997 | Clifford et al. | | 715/842 |
| 5,689,667 A * | 11/1997 | Kurtenbach | | 715/810 |
| 5,701,424 A * | 12/1997 | Atkinson | | 715/808 |
| 6,219,053 B1 * | 4/2001 | Tachibana et al. | | 715/835 |
| 6,236,987 B1 * | 5/2001 | Horowitz et al. | | 705/35 |
| 6,448,987 B1 * | 9/2002 | Easty et al. | | 715/834 |
| 6,538,635 B1 * | 3/2003 | Ringot | | 345/156 |
| 6,549,219 B2 | 4/2003 | Selker | | |
| 6,628,313 B1 * | 9/2003 | Minakuchi et al. | | 715/853 |
| 6,819,344 B2 * | 11/2004 | Robbins | | 715/848 |
| 6,938,218 B1 * | 8/2005 | Rosen | | 715/850 |
| 7,036,091 B1 * | 4/2006 | Nguyen | | 715/834 |
| 7,093,201 B2 * | 8/2006 | Duarte | | 715/853 |
| 7,096,431 B2 * | 8/2006 | Tambata et al. | | 715/834 |
| 7,134,092 B2 * | 11/2006 | Fung et al. | | 715/779 |
| 7,246,329 B1 * | 7/2007 | Miura et al. | | 715/810 |
| 7,418,670 B2 * | 8/2008 | Goldsmith | | 715/810 |
| 7,509,348 B2 | 3/2009 | Burtner et al. | | |
| 7,562,312 B2 * | 7/2009 | Rochford et al. | | 715/848 |
| 7,663,605 B2 * | 2/2010 | Fitzmaurice et al. | | 715/811 |
| 7,802,203 B2 * | 9/2010 | Danninger | | 715/841 |
| 7,890,886 B2 * | 2/2011 | Matthews et al. | | 715/809 |
| 7,996,788 B2 * | 8/2011 | Carmichael | | 715/834 |
| 8,136,045 B2 * | 3/2012 | Miura et al. | | 715/764 |
| 8,332,779 B2 * | 12/2012 | Hama et al. | | 715/830 |
| 8,352,881 B2 * | 1/2013 | Champion et al. | | 715/834 |
| 8,375,329 B2 * | 2/2013 | Drayton et al. | | 715/834 |
| 2002/0085037 A1 * | 7/2002 | Leavitt et al. | | 345/765 |

(Continued)

OTHER PUBLICATIONS

"Metadata driven menus through hierarchical lists", IBM TDB, Aug. 1, 2001, IPCOM000014930D.*

(Continued)

*Primary Examiner* — Stephen Hong
*Assistant Examiner* — Joseph R Burwell
(74) *Attorney, Agent, or Firm* — Patents on Demand P.A.; Brian K. Buchheit; Scott M. Garrett

(57) ABSTRACT

Hybrid menus can be generated and displayed, where the hybrid menus comprising primary and sub-menus having different geometries. Depending upon the context in which a user provides selection input for menu display, the context-appropriate model elements are retrieved from a tree model. A layout generation component transforms the tree model into a hybrid menu for display to the user.

22 Claims, 9 Drawing Sheets

(56) References Cited

U.S. PATENT DOCUMENTS

| | | | |
|---|---|---|---|
| 2002/0122072 A1* | 9/2002 | Selker | 345/834 |
| 2002/0184401 A1 | 12/2002 | Kadel, Jr. et al. | |
| 2003/0197740 A1* | 10/2003 | Reponen | 345/810 |
| 2004/0075693 A1* | 4/2004 | Moyer et al. | 345/810 |
| 2004/0095395 A1 | 5/2004 | Kurtenbach | |
| 2006/0090139 A1* | 4/2006 | Jenni et al. | 715/760 |
| 2006/0095865 A1* | 5/2006 | Rostom | 715/810 |
| 2006/0279541 A1* | 12/2006 | Kim et al. | 345/158 |
| 2007/0198949 A1* | 8/2007 | Rummel | 715/810 |
| 2008/0222569 A1* | 9/2008 | Champion et al. | 715/834 |
| 2009/0007012 A1* | 1/2009 | Mandic et al. | 715/810 |
| 2009/0037813 A1* | 2/2009 | Newman et al. | 715/702 |
| 2010/0064258 A1* | 3/2010 | Gorczowski et al. | 715/841 |
| 2010/0306702 A1* | 12/2010 | Warner | 715/811 |
| 2012/0066647 A1* | 3/2012 | Ullmann | 715/841 |

OTHER PUBLICATIONS

Hatch et al., "Hierarchical Menu Display Structure", IBM TDB, v. 34, n. 8, pp. 432-433, Jan. 1, 1992, IPCOM000107187D.*

"Quick Navigation Aid for Tree View", IBM TDB, Oct. 27, 2001, IPCOM000015209D.*

Hidaka, "Pull-Down Menu System With Privileged Sub-Menus", v. 34, n. 11, pp. 325-326, Apr. 1, 1992, IPCOM000108079D.*

Carstens, "Smoothly Collapsing Menus", Jun. 11, 2010, IPCOM000196672D.*

Jefferson et al., "Selecting Menu/Submenu for Editing", Research Disclosure, n. 345, Jan. 1, 1993, IPCOM000103773D.*

Gould et al., "Three-Dimensional Menu Icons to Aid Users in Understanding Hierarchy", IBM TDB, v. 33, n. 12, pp. 464-465, May 1, 1991, IPCOM000120659.*

Carstens, "Multilayer Flip Context Menu", Apr. 24, 2010, IPCOM000194932D.*

"Method and Apparatus for Visual Cueing in GUI Menus and Reducing Usage Movement", Jul. 28, 2008, IPCOM000173240D.*

Garg, "Menu Creation on Demand", Sep. 14, 2005, IPCOM000127904D.*

Caliendo et al., "Menu Search", Oct. 6, 2011, IPCOM000211484D.*

Blades et al., "Reorganizing Menu Hierarchy to Best Fit the Individual User", IBM TDB, v. 37, n. 02B, pp. 349-350, Feb. 1, 1994, IPCOM000111391D.*

"Directional Selection is as Easy as Pie Menus" Computer Graphics Workshop Oct. 10, 1997 http://www.donhopkins.com/drupal/node/88.

* cited by examiner

DYNAMICALLY GENERATING CONTEXT DEPENDENT HYBRID CONTEXT MENUS BY TRANSFORMING A CONTEXT SPECIFIC HIERARCHICAL MODEL

CROSS-REFERENCE TO RELATED APPLICATIONS

This application claims the benefit of Canadian Patent Application No. 2680602 filed 19 Oct. 2009, entitled "SYSTEM AND METHOD FOR GENERATING AND DISPLAYING HYBRID CONTEXT MENUS", which is assigned to the assignee of the present application, and the teachings of which are hereby incorporated by reference in their entirety.

BACKGROUND

The present invention relates to the field of graphical user interfaces for computing devices, and, more specifically, to providing dynamic generation and display of a hierarchical hybrid context menu at a graphical user interface.

Computer applications having graphical user interfaces (GUIs) generally provide menus of selectable application features. A standard in the field is to display a drop down list of selectable menu elements, either upon user activation (e.g., a keystroke or a right mouse click) or by user inaction (i.e., after a fixed period of mouse inactivity) when the cursor or pointer hovers over a designated area of the display screen. FIG. 1A (Prior Art) illustrates a context menu which appears upon right clicking anywhere on the user display when running a Graphical Modeling Framework ("GMF") tool. Traditional menu systems arrange the list of selections in a top-to-bottom linear configuration for user selection. If there are a large number of menu items, the lists will be broken into a primary list, often comprising the most frequently used menu items, and a plurality of sub-lists which are selectively displayed upon user selection of a menu item in the primary list. Display of a primary list with one expanded sub-list or sub-menu is shown for the context menu for GMF in FIG. 1B (Prior Art). Upon use selection of a particular heading on the primary list, the subsequent menu list (also referred to as a sub-list or a child menu) is displayed for user selection.

The use of linear lists with sub-lists has some drawbacks. Frequently, the sub-list will be automatically displayed only for so long as the user maintains the exact cursor, or pointer, position with respect to the expanded menu item from the primary list or an item on the sub-list. In addition, the user needs to carefully move the cursor laterally over to the sub-list/child menu list along the shared line or risk the disappearance of the list due to a newly-detected cursor position. Further, the menu items on linear lists and sub-lists often appear at unpredictable GUI locations in an attempt to display the selectable items away from screen edges and close to the current cursor location (e.g., lists above and below selected headings as shown in FIGS. 1B (Prior Art) and 1C (Prior Art) respectively. Unpredictable GUI locations also include displaying lists on the left or right of selected headings (not illustrated).

Pie menus, such as the one shown in FIG. 2 (Prior Art), have been used as a method for quick object selection. In a pie menu, a user's cursor located at the center of the pie display is distance invariant (i.e., the distance to select any one menu item is the same). The pros and cons of pie menus over traditional linear menus have been detailed in a publication by P. Hopkins, entitled "Direction Selection is Easy as Pie Menus" from Computer Graphics Workshop (Oct. 10, 1997).

Radial menus, which are variations on traditional pie menus, also have advantages and disadvantages. The radial menu depends on having unique icons and a 1:1 aspect ratio for every item, since wide text blocks will skew the pie's geometry. As shown in FIG. 3 (Prior Art), a radial menu including eight primary segments, 31-38, is displayed to a user. When the user hovers over or actively selects one of the segments, 32, a sub-menu is displayed including sub-segments 32.1, 32.2 and 32.3.

SUMMARY

An embodiment of the disclosure provides a system, method, and computer program product for generating and displaying hybrid menus comprising primary menus and sub-menus having different geometries. Depending upon the context in which a user provides selection input for menu display, the context-appropriate model elements are retrieved. Based on the model elements and the properties of the model elements, a tree model is dynamically generated and optimized for display as a hybrid menu.

DETAILED DESCRIPTION

Figure 1A:
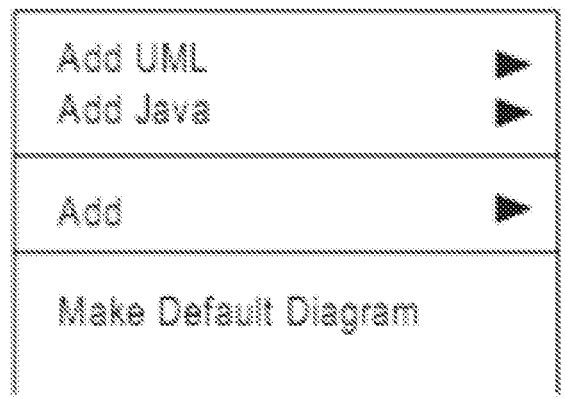
FIGS. 1A-1C (Prior Art) illustrate graphical user interfaces displaying linear menus as are well known in the art.
Figure 1B:
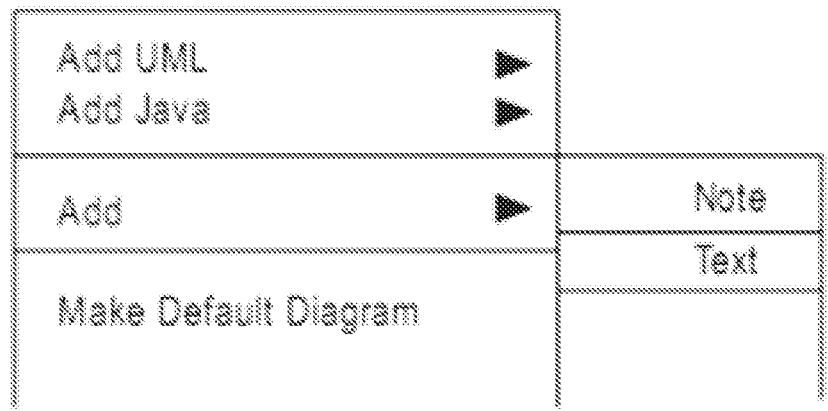
Figure 1C:
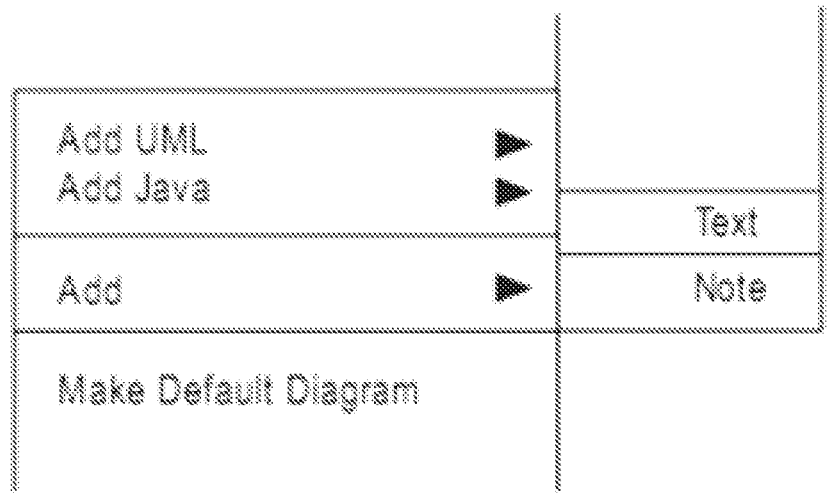
Figure 2:
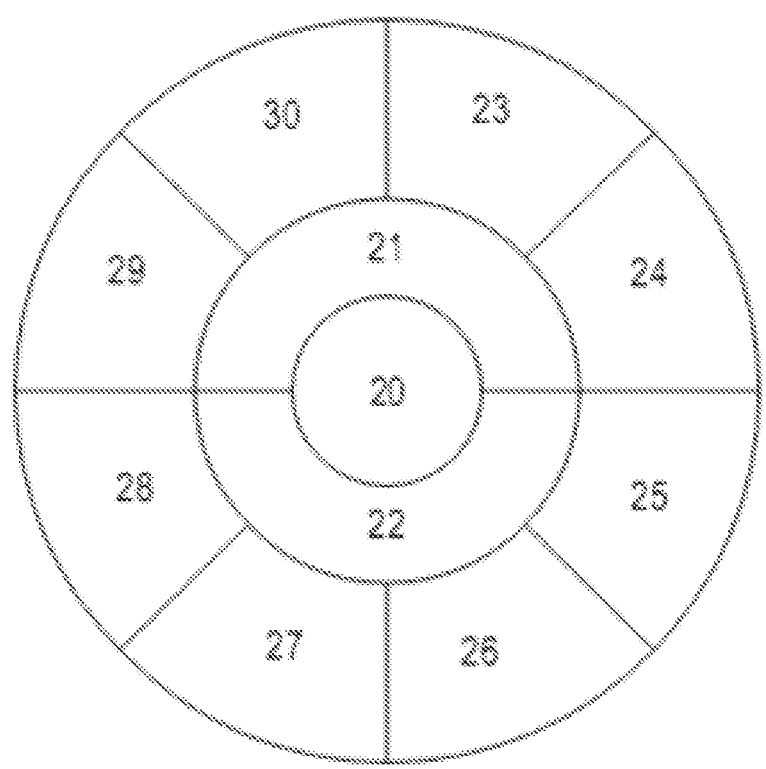
FIG. 2 (Prior Art) illustrates a pie menu for a graphical user interface.
Figure 3:
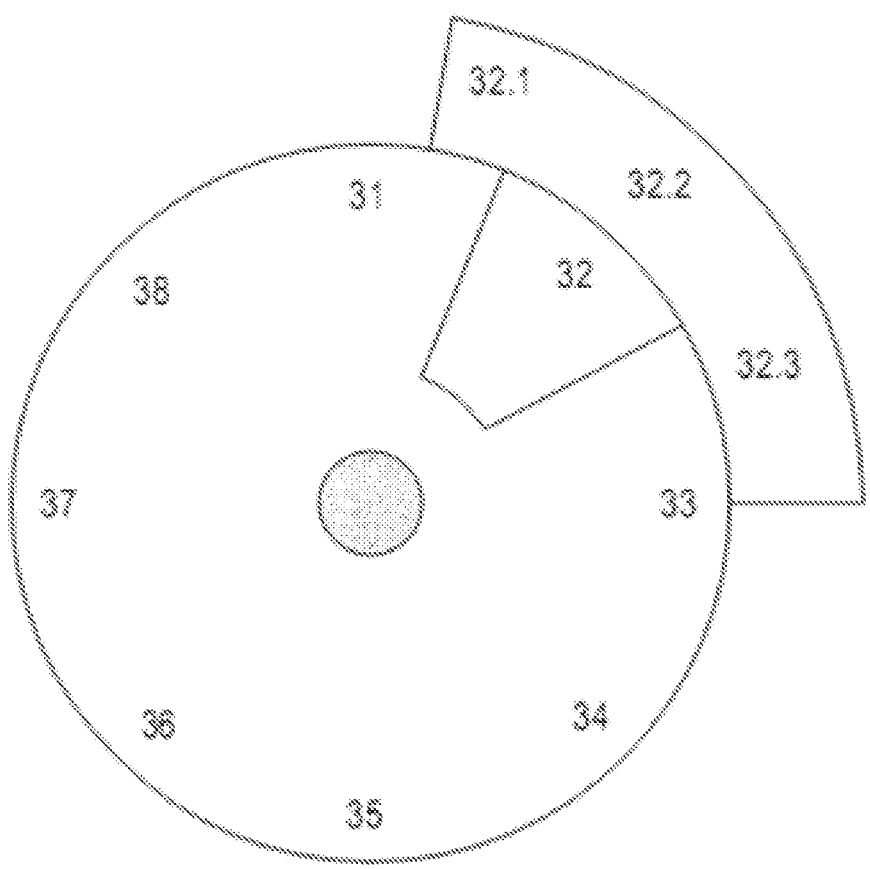
FIG. 3 (Prior Art) illustrates a radial menu with an expanded sub-menu.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning to the figures, the advantages of radial and linear menus are realized by a system, method, and computer program product for automatically and dynamically generating hybrid menus and sub-menus for display to a user.

Figure 4A:
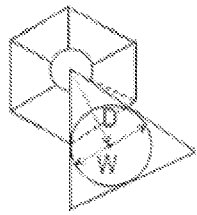
FIGS. 4A and 4B illustrate Fitts' law with reference to radial and linear menus.

Fitts' law and the law of steering can be used to predict user performance without performing user trials. Given a radial menu having six (6) segments as shown in FIG. 4A and a linear menu having the same number of entries, it can be seen that user navigation is greatly facilitated by the radial layout. Fitts' law is shown in Equation 1.

$$T = a + b \int \log_2\left(\frac{D}{W} + 1\right) \quad \text{(Equation 1)}$$

Where T is the average time taken to complete the movement; a represents the start/stop time of the device and b stands for the inherent speed of the device. These constants can be determined experimentally by filling a straight line to measured data. D is the distance from the starting point to the center of the target, and W is the width of the target measured along the axis of motion. W can also be thought of as the allowed error tolerance in the final position, since the final point of motion must fall within ±W/2 of the target's center.

Figure 4B:
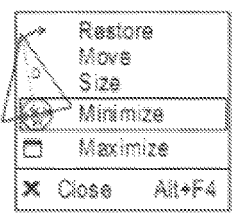

From the equation, it can be seen that there is a speed-accuracy trade-off associated with pointing, whereby targets that are smaller and/or further away require more time to acquire. FIGS. 4A and 4B show how these parameters can be extracted from the radial and linear menus. The figures show the best case parameterization for the linear menu by choosing the closer edge, and one of the many equivalent parameterizations of the radial menu considering that the D/W ratio would stay approximately the same for clicks anywhere close to the center. As illustrated by FIGS. 4A and 4B, in the radial menu, the D/W ratio for any particular menu item is a constant for a given number of total items in the menu; whereas, in the linear menu, the D/W ratio increases for items further down the list.

The system and method for generating and displaying hybrid menus generates primary menus and sub-menus having similar or different geometries. As in the prior art, a context-appropriate hierarchy of model elements is retrieved as a function of the context in which a user provides selection input. Departing from the prior art, in which model elements were displayed using fixed display geometry, however, the inventive system queries the model for what type of view shall be used to display it. The model is then transformed to optimize user interaction performance characteristics associated with the views, while observing constraints to preserve semantic structure of the input model. Views of similar and differing geometries are bound together using a common geometric coupling constraint to form a hierarchical menu for display to the user. A layout generator then arranges items within each menu to optimize access time, while observing constraints that preserve the user's ability to build muscle memory of paths to item locations. For the special case of radially-arranged menus, it keeps item positions consistent between multiple invocation contexts using a preferred angle property on model elements, and a combinatorial optimization algorithm to minimize departure from specified angles when conflict occurs. The hybrid menu is then bound with interaction logic to form a fully functional command interface. Further, the hybrid menu is provided with the logic for detecting and responding to events affecting the layout of items in the hybrid menu, thereby facilitating automatic updating.

Figure 5A:
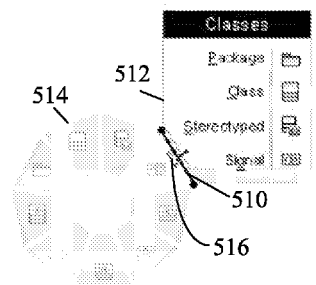
FIG. 5A illustrates a coupling constraint in accordance with the disclosure.
Figure 5B:
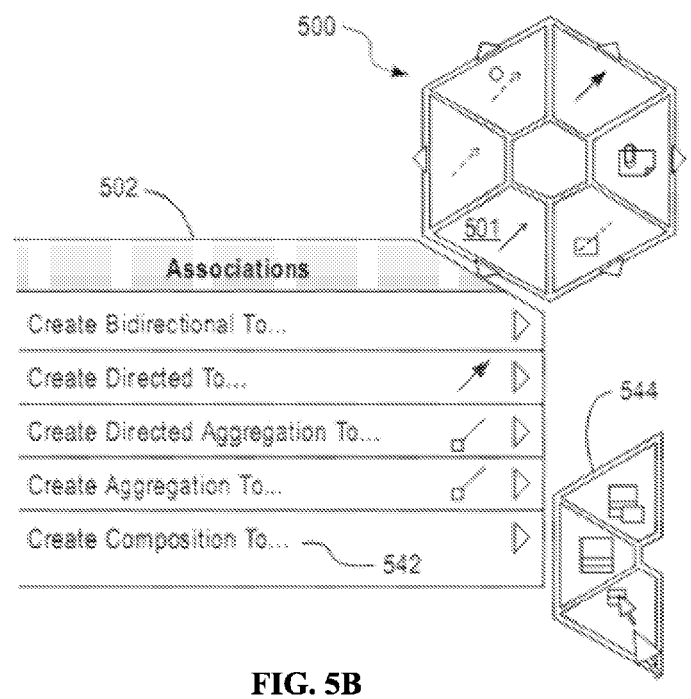
FIG. 5B is a diagram illustrating the hybrid menu generated in accordance with the disclosure.

FIG. 5B is a diagram representatively illustrating a hybrid menu in accordance with the disclosure. The hybrid menu addresses the disadvantages of the prior art radial menu by dynamically expanding radial pie segments to display modified linear sub-menus having labels. A hybrid menu may comprise any combination of radial and linear menus, as well as other geometries supported by the coupling constraint.

The coupling constraint refers to a visual element used to bind one menu to another menu. For example, two adjoining menus can share a common geometric feature of an interface element. FIG. 5A shows a coupling constraint 510, which has two end points that form a tangent between menu 512 and menu 514. Notch 516 can indicate which of the tangent's two normal is "outward". The illustrated example is intended to be illustrative and non-limiting. It should be understood that coupling constraint can be used to describe a coupling of different menus of arbitrary geometry (e.g., a curved puzzle-piece outline, a bounding box, a common color, etc.)

For ease of description, and with reference to FIG. 5B, the primary menu will refer to a radial menu 500 having a linear sub-menu 502 which, in turn, has a radial sub-menu 544. Upon user selection of a radial segment, for example segment 501, the modified linear sub-menu, "Associations" sub-menu 502, is displayed. Where the prior art linear context menus formed long narrow tunnels to travel from menu to sub-menu, the hybrid menu includes paths from radial menu items in segments to linear sub-menus which are short and wide and easier to navigate. The modified linear sub-menus are positioned as close to their centers (i.e., their radial segment) as possible to cut the average distance to the target menu items. Since each sub-menu will expand in relation to a shared tangential line with its parent pie segment, user expectation is satisfied that the sub-menu for the selected radial pie segment will always be displayed in the same orientation to the primary radial display and that a desired sub-menu item, for example "Create Composition To . . . " at 542 will always be found in its currently-displayed location relative to the radial pie display. Moreover, as further detailed below, menu items in displays which are dynamically generated for different contexts will preferably be displayed in the same location relative to their primary radial displays, again to facilitate user memorization and ease of use. Upon user selection of sub-menu item 542, a sub-sub-menu 544 is displayed.

Figure 6A:
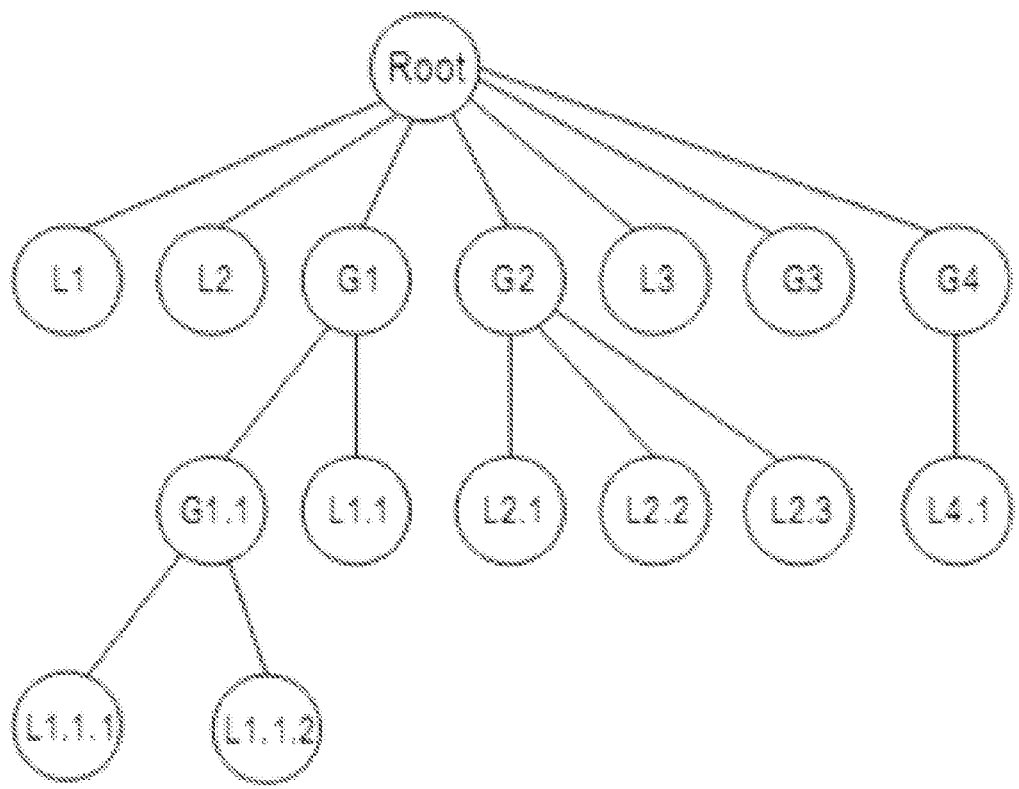
FIGS. 6A and 6B illustrate a sample uncompressed menu model and linear arrangement, respectively.
Figure 6B:
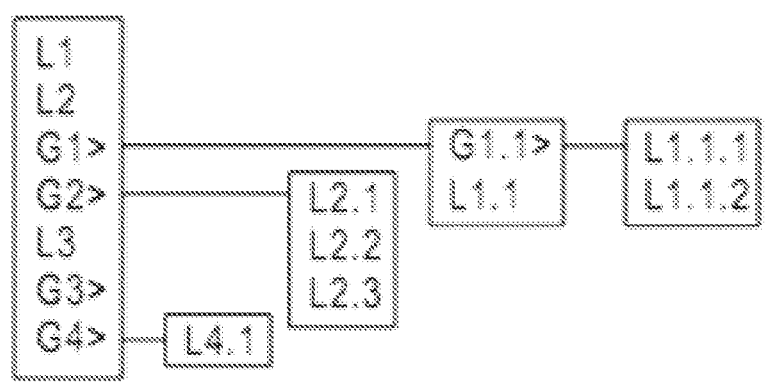

In order to generate a hybrid menu, model elements are first retrieved for the context and a tree structure, or other hierarchical model representation, is generated. FIG. 6A illustrates a sample uncompressed menu model showing the relationships between menu and sub-menu items. FIG. 6B illustrates generally how those items would be configured for linear display. Given the simple model illustrated, leaf items are labeled "L" and groups are labeled "G". FIG. 6A provides a tree model of the menu items and FIG. 6B illustrates how those items would be displayed using a standard linear menu. The disclosure seeks to automatically optimize the menu for fast access, optimal use of screen real estate, discoverability of items and any number of other factors that depend on how the user interacts with the visual representation of the menu model. The hybrid menu system of the disclosure optimizes the tree model using model element properties a further detailed below.

Figure 7A:
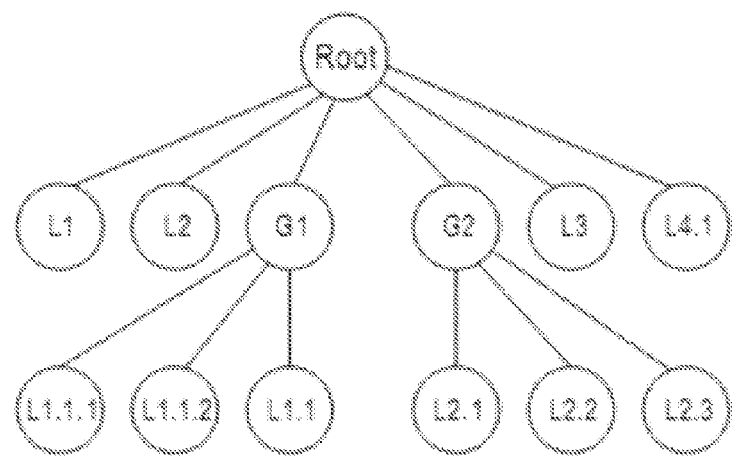
FIGS. 7A and 7B illustrate a model of FIGS. 6A and 6B optimized for a radial menu and for a linear menu, respectively.
Figure 7B:
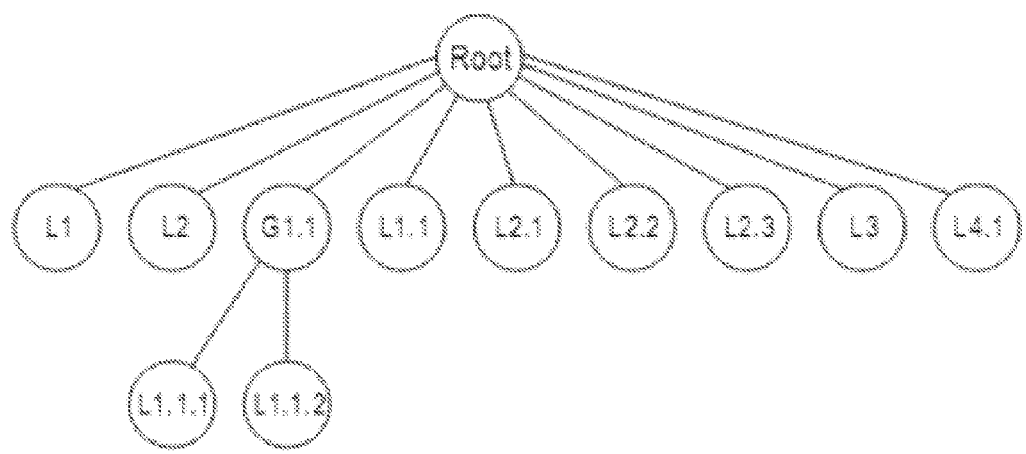

FIGS. 7A and 7B illustrate the model of FIG. 6A optimized for a radial menu and for a linear menu, respectively. Since radial menus preferably have no more than 10 segments, and ideally have between 5 and 8 segments, the model of FIG. 6A is preferably evaluated to have 5-8 menu items in the primary radial display. Radial menus are ideal for handling sub-menus, providing a quick, constant distance, ease of memorization and a widened path for mouse movement toward sub-menu items. If the menu has fewer than the ideal number of items, for example 6 items, selected groups can be exploded. The "explosion" of a submenu moves all of that sub-menu's items into the parent menu, surrounds them with separators, and removes the sub-menu. If there are too many items, all of the leaf items can be collected into a group. As shown in FIG. 7A, group G4 has been automatically exploded since it has only one child; G3 has been eliminated since it had no children, and G1 and G2 have been left intact, since exploding either or both of them would push the root's child count past the ideal. In contrast, however, G1.1 has been exploded into G1, since it brings the item segment number closer to the ideal.

FIG. 7B shows the same model from FIG. 6A optimized for a linear menu. With linear menus, a higher item limit can be set for the primary display and sub-menus are usually exploded into the top level menu with separators. FIG. 7B shows the optimization of the FIG. 6A model wherein G4 has been automatically exploded since it had only one child item, G3 was eliminated for having no child items, and both G1 and G2 have been exploded into root due to the linear menu's higher fan-out limit. As illustrated, the fan-out limit was set at 9. Had the limit been higher, G1.1 would also have been exploded to the higher layer.

Under the disclosure, a new model of model elements selected for the context is created each time a user provides selection input in order to generate a hybrid display. Once a tree or other hierarchical model is created, it is then transformed to generate the hybrid menu display. In evaluating menu items for generating the model, ordering of items is preferably undertaken. For example, ordering rules can be effected for ordering based on criteria such as historical usage, location consistency, or other factors. To optimize discovery and access times, for example, the most frequently used items should appear in a consistent position in primary radial menus or, if relegated to the linear sub-menus, should appear first in the linear sub-menus. Ideally items are ordered by the percentage of time that the items are selected by a user within a given task context. The percentage of time of user access may be predefined for a given context or may be dynamically tracked for a particular user. Tables of values representing the ordering criteria for each menu item preferably resides in one place where the menu items and associated values can be dynamically updated in relation to each other. For example, a user may enable different capabilities of an application which would cause an update to the ordering. The ordering under the disclosure preferably orders groups and items within groups with the priority of groups being derived from the priority of the items within them.

Menu items are represented as model elements which are stored, for example in the aforementioned tables. When user selection input is received for a location and context, the relevant model elements are retrieved. Model elements would be, for example, the features that are available to the user relative to the context (e.g., program) and location (e.g., a displayed object) at which the user selection input was detected. Each model element is stored with so-called dependency, or family, properties as well as display properties related to its ultimate display. The dependency or family properties are used for generating the hierarchical model. Model element display properties are used for transforming the hierarchical model into the hybrid display and include, but are not limited to, a preferred angle for display, a priority weight factor, an explicit group flag and a display menu preference. The preferred angle for display refers to a consistent location relative to a primary display or sub-menu item. As noted above, it is preferable that menu items be displayed consistently regardless of the context for which the menu items are being displayed. A preferred angle property tells where that menu item is preferably situated in a display. The priority weight factor property tells the importance of the model element. In dynamically generating hybrid menus, the higher priority menu items are preferably displayed in the primary radial display. The priority weight factory property is also used to order elements in linear sub-menus where position determines access times. The explicit group flag is used to flag an explicit group of menu items that should not be exploded during layout. Finally, the display menu preference property tells how the model element should be displayed. The display menu preference property may indicate "radial", "linear" or any other geometry, or it may indicate "auto". In one embodiment, auto can refer to a default menu preference. In another embodiment, a set of previously defined rules can determine a perceived optimal display menu for model elements, which can be in conformance with an underlying model (selected using the rules) from which the menu was generated.

Figure 8:
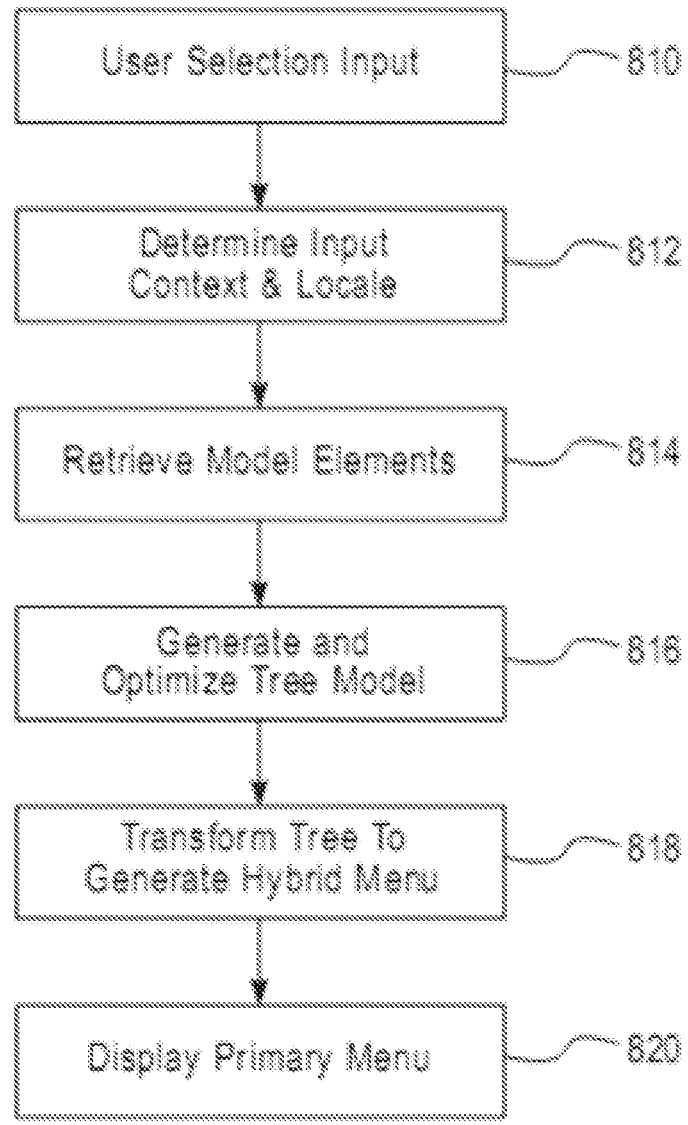
FIG. 8 is a process flow for automatically generating a hybrid menu in accordance with the disclosure.

FIG. 8 is a process flow for automatically generating a hybrid menu in accordance with the disclosure. The process is to dynamically generate context-dependent hybrid menus. The hybrid menus may comprise any combination of radial and linear menus, as well as other geometries supported by the coupling constraint. For ease of description, as above with reference to FIG. 5B, the primary menu will refer to a radial menu having a linear sub-menu which, in turn, has a radial sub-menu. The process of FIG. 8 starts with user selection input at 810. The user selection input may, for example, be a right click on a screen area, inactivity in a screen area at which a cursor/pointer is displayed, touch screen input, keystroke input, etc. The system determines where the input was received and identifies the context at step 812. Next, context-dependent model elements are retrieved given the context and area of display at 814. Once the model elements have been retrieved, these elements can be transformed or optimized for display. The transforming/optimizing can take into account the model element properties of display menu preference, explicit group flag and priority at 816. The tree model is then transformed to generate the hybrid menu, at step 818. Transforming the optimized tree model comprises creating radial and linear menus from the optimized model, consistent with the display menu preference (i.e., radial/linear view type) followed by the layout process of arranging the items within each menu, taking into account the priority and preferred angle model element display properties. Each of the menu items is associated with interaction functionality. The generated hybrid menu includes the primary and all sub-menus. Initially only the primary menu is displayed at step 820. Thereafter, if the user selects one of the primary menu segments, the interaction will cause a sub-menu to be displayed.

Figure 9:
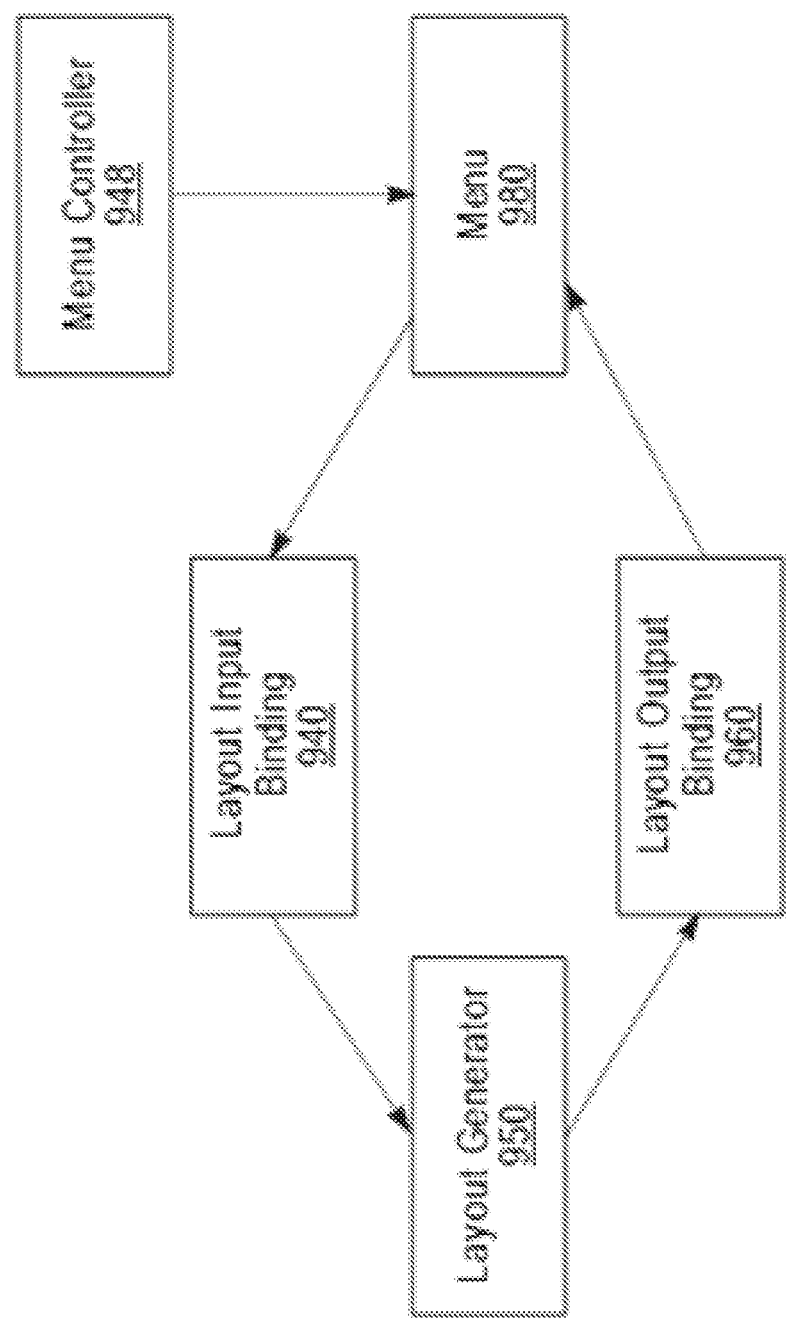
FIG. 9 illustrates the logical flow for transforming a tree menu into a hybrid menu in accordance with the disclosure.

Further details of the transformation of the optimized tree menu into a hybrid menu, in accordance with one implementation-specific embodiment, are depicted in FIG. 9. The implementation shown by FIG. 9 illustrates a situation where dynamic updates of the menu occur if the underlying model changes while the menu is displayed. FIG. 9 is intended for illustrative purposes only and alternatives to this implementation specific example are contemplated.

In FIG. 9, a Menu Controller 948 creates radial and linear menus from the optimized tree model to generate a menu figure 980. The figure controller creates instances of the Menu 980 and its child menus, a Layout Input Binding 940 which listens for event data, such as user interaction input or Menu Controller input that may affect the menu layout, a Layout Generator algorithm 950 which receives the input from the Layout Input Binding and executes to generate the layout of the hybrid menu and a Layout Output Binding 960 which applies the changes to the menu figure 980. The Menu Controller then "wires everything up" by adding the children to the main Menu figure 980, setting the Layout Input Binding to listen for events on the main Menu figure, setting the main Menu figure's input binding to the one it created, setting the input binding's layout algorithm to the one it created, setting the Layout Algorithm's output binding to the one it created, and setting the Layout Output Binding's target to the main Menu figure.

When an event that changes layout occurs in the main figure (e.g. child added), the Layout Input Binding assesses whether the event affects parameters that the Layout Algorithm is interested in. If the event does affect parameters the layout is interested in, the Layout Input Binding instructs the Layout Algorithm to run. The Layout Algorithm pulls parameters of interest from the figure through the Layout Input Binding (which may provide some translation). During execution, the layout algorithm sends results to the Layout Output Binding, which applies them to the main Menu figure and its children (possibly with some translation) by either applying the results/changes immediately or buffering the results and applying all changes at once when complete. The Layout Output Binding may also buffer the results and pass them to an optional Animation Controller (not shown) which will apply the changes over time.

Figure 10:
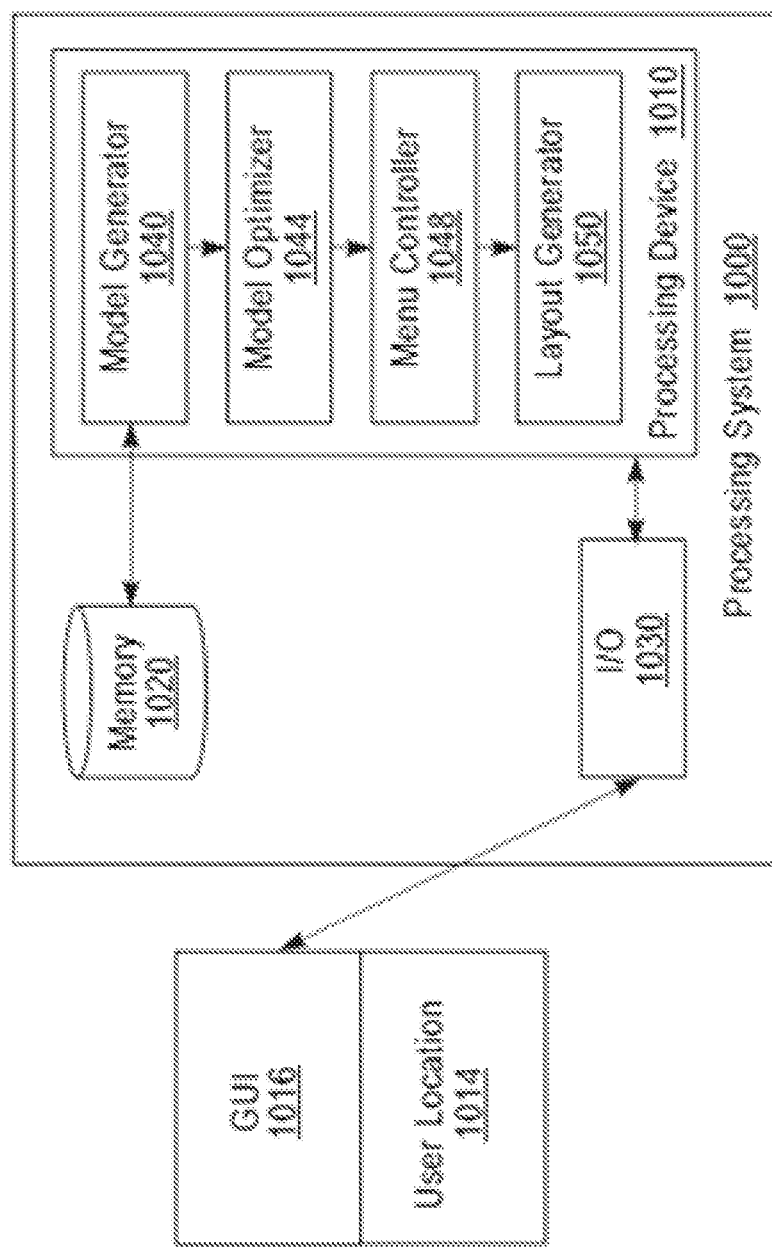
FIG. 10 illustrates a system for implementing the disclosure.

FIG. 10 illustrates a representative computer system for implementing the hybrid menu display system of the disclosure. The hybrid menu display system may be located at a user device or remote from the user device (e.g., at a LAN server or at a remote server in a cloud computing environment). In FIG. 10, the exemplary processing system 1000 includes a processing device 1010 for executing software components, including the Model Generator Component 1040, Model Optimizer Component 1044, Menu Controller 1048 and Layout Generator Component 1050. The system further has remote (not shown) or local memory 1020 coupled to the processor, as well as input/output (I/O) circuitry 1030 operative to interface with the processor and with a user graphical display device. The processor 1010 may be configured to load and execute features of the Model Generator Component 1040, Model Optimizer Component 1044, Menu Controller 1048 and Layout Generator Component 1050 to perform at least a portion of the methodologies of the disclosure, illustrative embodiments of which are described herein. Display 1012 may be provided at the processing system 1000 for display to the user. Alternatively, the processing system 1000 will send the display information to a remotely-located graphical user interface 1016 at a user location 1014.

The hybrid menu is dynamic and scalable to accommodate new application features, etc. without requiring complete overhaul of the menu structure and its attendant disruption to user expectations. Moreover, a hybrid menu can automatically update itself. The current hybrid menu implementation is already initialized from a simple interface based menu model and can be extended to listen to that model for changes to the menu structure. Menu elements are arranged by a loosely-coupled and configurable layout algorithm that can handle a wide array of configurations. Ideally, a layer is provided in between existing menu contributions and the menu model that will intelligently optimize groupings to optimize hybrid menus. By taking into account menu groups, sub-menus, the presence of icons, the number of children in a group, and any other appropriate metrics, the menu model will resolve any conflicts between linear and hybrid menu groupings to automatically reconfigure existing menus for display as hybrid menus.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For example, FIG. 9 is a block diagram depicting an exemplary processing system 900 formed in accordance with an aspect of the invention. System 900 may include a processor 910, memory 920 coupled to the processor (e.g., via a bus 940 or alternative connection means), as well as input/output (I/O) circuitry 930 operative to interface with the processor. The processor 910 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Additionally, implementation details may modified without departing from the spirit and scope of the present invention. For example, the above description describes implementation details for radial menus, including pressing the alt key to cause all label callouts to protrude from the menu at once, complete with accelerator key underlines, as well as left and right arrows to cycle through elements in the menu, the up arrow used to expand sub-menus, and the down arrow to collapse them. Clearly display alternatives may be implemented yet still be covered by the present invention.

What is claimed is:

1. A computer-implemented method for dynamically generating context-dependent hybrid menus for display at graphical user interfaces comprising:
    interpreting user input to the graphical user interface to determine context;
    selecting model elements representing menu items for said determined context;
    generating a hierarchical model comprising the selected model elements;
    determining a view for displaying the model elements of the hierarchical model from a plurality of views based on user interaction performance characteristics of the plurality of views; and
    transforming the hierarchical model to generate a hybrid menu based on the determined view, the hybrid menu comprising primary menu coupled to one or more sub-menus;
    on the graphical user interface, displaying the primary menu as a radial menu having a plurality of radial pie segments, each radial pie segment representing a user selectable elements, at least a portion of the user selectable elements corresponding to one of the sub-menus; and on the graphical user interface, responsive to one of the radial pie segments being selected that has a corresponding one of the sub-menus, displaying the corresponding sub-menu as a linear submenu having user selectable elements.

2. The method of claim 1 further comprising: on the graphical user interface, responsive to one of the user selectable elements of the linear submenu being selected, displaying a corresponding sub-sub-menu as a radial menu having a plurality of radial pie segments of user selectable elements.

3. The method of claim 1, wherein the at least one primary menu comprises at least one indicator for user selection for display of at least one sub-menu and wherein the method further comprises:

receiving user selection input at said at least one indicator; and displaying the at least one sub-menu associated with the selected indicator.

4. The method of claim 1, wherein each of said model elements comprise model element properties and wherein the generating of the hierarchical model comprises determining model element positioning in the hierarchical model based on the model element properties.

5. The method of claim 4, wherein the model element properties comprise at least one of a preferred menu display geometry property, a preferred angle property, and an explicit group property.

6. The method of claim 5, wherein said preferred menu display geometry property comprises at least one of radial and linear display.

7. The method of claim 5, wherein the preferred menu display geometry property indicates no preference whereby said transforming comprises automatic menu display geometry determination.

8. The method of claim 1, wherein said generating a hierarchical model comprises creating a tree model.

9. The method of claim 1, wherein said generating a hierarchical model comprises ordering model elements based on a frequency of use value for said model elements in the determined context.

10. The method of claim 9, wherein the frequency of use value comprises one of a predefined frequency value and a tracked frequency value for a given user.

11. The method of claim 1, wherein at least one menu comprises a radial menu having segments and wherein said transforming comprises applying a coupling constraint to couple at least one sub-menu with a corresponding radial menu segment.

12. The method of claim 1, wherein said displaying a radial primary menu comprises displaying a number of segments having icons.

13. The method of claim 12, further comprising selectively displaying labels for said icons based on user input.

14. The method of claim 1 further comprising:
at least one of adding and updating model elements based on newly added or newly enabled context features.

15. The method of claim 1, wherein the primary menu comprises a radial menu and further comprising applying dynamic model adjustment when the number of model elements for said primary menu exceeds or falls below a predefined optimal number of radial segments.

16. The method of claim 4, wherein the model element properties comprise a display geometry property, a preferred angle property, and an explicit group property, and wherein said transforming the hierarchical model to generate a hybrid menu comprises:

optimizing the hierarchical model based on the preferred menu display geometry property and the explicit group property for each menu item in the hierarchical model;

creating radial and linear menus of menu items from the optimized model, based on the preferred menu display geometry property of each menu item; and arranging menu items within each menu using the preferred angle property for each menu item.

17. A system for dynamically generating context-dependent hybrid menus for display at graphical user interfaces, said system comprising at least one processing device for executing components and further comprising:

an input interpretation component for interpreting user input to the graphical user interface to determine input location and context;

a model element selection component for selecting model elements representing menu items for said determined context;

a model generating component for generating a hybrid menu that is displayable on a graphical user interface, said hybrid menu comprising a primary radial menu having a plurality of radial pie segments that are user selectable elements, wherein two or more of the radial pie segments have a corresponding segment unique, linear sub-menu that is dynamically presented with the graphical user interface upon receipt of a user selection of the corresponding radial pie segment.

18. The system of claim 17 further comprising at least one display generation component for displaying at least the one primary menu at the graphical user interface.

19. The system of claim 17 further comprising at least one storage location for storing said model elements.

20. The system of claim 17 wherein said hierarchical model component comprises:

a model optimizer for optimizing the hierarchical model based on a preferred menu display geometry property, an explicit group property and a priority weight factor property for each menu item in the hierarchical model;

a menu controller for creating radial and linear menus of menu items from the optimized model, based on a preferred menu display geometry property of each menu item; and a layout generator for arranging menu items within each menu using a preferred angle property and a priority weight factor property for each menu item.

21. A computer program product comprising a non-transitory tangible computer readable medium storing embodying a program of instructions executable by a computing machine for performing a method comprising the steps of:

on the graphical user interface, displaying a primary menu as a radial menu having a plurality of radial pie segments, each radial pie segment representing a user selectable elements, at least a portion of the user selectable elements corresponding to one of a plurality of sub-menus; and on the graphical user interface, responsive to one of the radial pie segments being selected that has a corresponding one of the sub-menus, displaying the corresponding sub-menu as a linear submenu having a plurality of user selectable elements.

22. An apparatus for dynamically generating context-dependent hybrid menus for display at graphical user interfaces comprising:

a processor for executing computer implemented instructions;

a memory that is a non-transitory storage medium that stores at least one computer program product comprising computer implemented instructions;

a bus for communicatively linking said memory and said processor, wherein said processor when executing the at least one computer program products is operable to:

interpret user input to the graphical user interface to determine input location and context;

select model elements representing menu items for said determined context;

generate a hierarchical model comprising the selected model elements;

determine a view for displaying the model elements of the hierarchical model from a plurality of views based on user interaction performance characteristics of the plurality of views;

transform the hierarchical model to generate a hybrid menu based on the determined view, the hybrid menu comprising at least one primary menu coupled to at least one sub-menu, at least one of the primary and at least one sub-menu comprising a radial menu;

on the graphical user interface, display the primary menu as a radial menu having a plurality of radial pie segments, each radial pie segment representing a user selectable element, at least a portion of the user selectable element corresponding to one of the sub-menus; and on the graphical user interface, responsive to one of the radial pie segments being selected that has a corresponding one of the sub-menus, display the corresponding sub-menu as a linear sub-menu having user selectable elements.

* * * * *